(12) United States Patent
Kim (10) Patent No.: US 8,181,751 B2
(45) Date of Patent: May 22, 2012

(54) SAFETY BRAKING DEVICE OF VEHICLE

(75) Inventor: Jongsung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 411 days.

(21) Appl. No.: 12/621,826

(22) Filed: Nov. 19, 2009

(65) Prior Publication Data

US 2010/0147637 A1   Jun. 17, 2010

(30) Foreign Application Priority Data

Dec. 11, 2008   (KR) .................. 10-2008-0125715

(51) Int. Cl.
*F16D 55/08*   (2006.01)
(52) U.S. Cl. ............... 188/72.8; 188/72.2; 303/115.2
(58) Field of Classification Search ............ 188/72.2, 188/72.7, 72.8, 156–164; 303/115.1, 115.2
See application file for complete search history.

(56) References Cited

U.S. PATENT DOCUMENTS

| 6,634,724 | B2 * | 10/2003 | Kobayashi et al. ........... 303/155 |
| 7,849,976 | B2 * | 12/2010 | Kawahara et al. ........ 188/1.11 E |
| 2007/0074938 | A1 * | 4/2007 | Cho ............................. 188/162 |
| 2007/0188018 | A1 | 8/2007 | Reuter et al. |

FOREIGN PATENT DOCUMENTS

| JP | 2005-319848 A | 11/2005 |
| KR | 10-2004-0051851 A | 6/2004 |

* cited by examiner

*Primary Examiner* — Christopher Schwartz
(74) *Attorney, Agent, or Firm* — Knobbe Martens Olson & Bear, LLP (57) ABSTRACT

A brake apparatus includes a motor-based braking unit driven by control of an ECU and equipped with a BIR operating unit, that is, a BIR-equipped braking unit having a BIR (Ball In Ramp) function of generating straight movement force using changes in path of balls disposed between ramps rotating, such that it can achieve F-S (Fail-Safe) and generate emergency braking force for safety by operating the BIR operating unit using a pedal-coupled cable only by operating a brake pedal even if a motor of the motor-based braking unit fails.

11 Claims, 5 Drawing Sheets

SAFETY BRAKING DEVICE OF VEHICLE

CROSS-REFERENCE TO RELATED APPLICATIONS

The present application is based on, and claims priority from, Korean Application Serial Number 10-2008-0125715, filed on Dec. 11, 2008, the disclosure of which is hereby incorporated by reference herein in its entirety.

BACKGROUND

1. Field

The present disclosure relates to a brake system, particularly a safety braking device for emergency braking of a vehicle, and a vehicle brake system using the same.

2. Discussion of the Related Technology

In general, hydraulic brakes operate in a way of strongly pressing pads against a disc using hydraulic pressure, in braking. These hydraulic brakes have some limits on improvement of safety and reliability of braking performance due to the complicate structure and using hydraulic pressure, such that EMB (Electro Mechanical Brake) that can provide a simple construction, which cannot be achieved by hydraulic brakes, and improve reliability of the braking performance have been used.

EMB operate in a way of pressing a pad for braking by directly converting power of a motor into straight-moving force. EWB (Electro Wedge Brake) have been known as the EMB, which operates for braking in a way of using a wedge action, which increases input force, by pressing pads against a disc, using a wedge assembly that makes the wedge action for increasing the input force, that is, which is operated by an actuator, instead of directly converting power of a motor into straight-moving force. EMB and EWB are generally called BBW (Brake By Wire) technology.

However, since the electro mechanical brakes should be provided with 12V for operation and use electronic signals and electric devices for braking, they basically have a limit in that FR (Failure Rate) is higher, as compared with hydraulic braking systems.

Therefore, a variety of methods have been developed to reduce the FR (Failure Rate) to the stable level of hydraulic braking methods. For example, the FR (Failure Rate) is reduced by achieving F-S (Fail-Safe) by forming a control login that controls EWB or EMB and a circuit reflecting the logic; however, this is not equipped with a device that mechanically generates braking force when a motor, a power source, fails. Accordingly, safety deteriorates, which provides a cause that makes it difficult to practically apply to vehicles.

The foregoing discussion is to provide general background information, and does not constitute an admission of the prior art.

SUMMARY

Embodiments of the present invention achieve vehicle braking by apply EMB that generates straight movement force using motor power or EWB that generates wedge action using motor power, achieve F-S (Fail-Safe) by operating a brake pedal using an EWB or EMB type braking device when a motor fails, and achieve stable FR (Failure Rate), such as hydraulic braking, in EMB or EWB, which are applied to vehicles, by generating emergency braking force for safety even if the motor fails.

Further, embodiments of the present invention improve common use by further providing a BIR (Ball In Ramp) generating straight movement force while rotating between balls to an EMB or EWB type braking device to satisfy laws about BBW (Brake By Wire) braking devices by generating emergency braking force through the brake pedal.

Further, embodiments of the present invention improve applicability to vehicle by providing BIR (Ball In Ramp) to an EMB or EWB type braking device such that braking operation is connected with brake pedal through a cable, in order that main braking is achieved at the rear wheel that requires smaller braking force than the front wheel.

One aspect of the invention provides a safety braking device for emergency braking of a vehicle which includes: an ECU that detects the condition of a vehicle and controls braking, to brake the vehicle; a brake pedal that has a sensor transmitting a pedal effort stroke to the ECU; a motor-based braking unit that has a motor generating output torque by being driven by control of the ECU, to brake the vehicle by holding a wheel disc; a pedal-coupled BIR operating unit that pulls a cable connected to the motor-based braking unit, in response to pressing down of the brake pedal by control of the ECU detecting failure of the motor; and a BIR operating unit that is joined to a pad pressing portion of the motor-based braking unit, to generate axial straight movement force while rotating by pulling force of the cable and make the motor-based braking unit press pads against the wheel disc, using the axial straight movement force.

The pedal-coupled BIR operating unit includes: a coupled rod that is interlocked to the brake pedal; a pedal simulator that follows pedal effort characteristics according to hydraulic hysteresis through a spring, when the coupled rod is moved by the brake pedal; and a selective connecting member having a solenoid that is turned on or off not to pull the cable by restricting axial movement force due to load applied by the pedal simulator, when not being turned off by the ECU.

The pedal simulator includes: a moving bracket that moves with the coupled rod fixed to the brake pedal in a housing; and a pedal effort response member that has at least one spring or more that are elastically supported by the moving bracket and transmitting load applied after being compressed by a stroke. The pedal effort response member is fluid filled in the housing.

The selective connecting member is a NLS (Non-Self Locking) type screw that is axially moved by external force applied, and has an NSL screw shaft having one end receiving load from the pedal simulator and the other end where the cable, which is pulled by straight movement, is fixed, an NSL nut fitted on the NSL screw shaft, and a solenoid that has a ratchet rod supported by a return spring and restraining or releasing the NSL nut, and is turned on or off by the ECU.

The BIR operating unit includes: a hinge lever where the cable is fixed to the opposite side to a hinge shaft; an input ramp that is rotated by the hinge lever and an output ramp that is disposed to face the input ramp; and balls that are disposed in a groove formed between the input and output ramps, and axially push the output ramp while being moved by rotation of the input ramp.

The motor-based braking unit includes: a motor that is driven by the ECU; a decelerator having driving and driven gears to convert the rotational force of the motor into output torque; and a pressing nut that is fitted on the screw shaft pressing the pads against the wheel disc by converting the output torque generated by the decelerator into axial straight movement.

Another aspect of the invention provides a vehicle brake system using a safety braking device for emergency braking of a vehicle which includes: an ECU that detects the condition of a vehicle and controls braking, to brake the vehicle; a brake pedal that has a sensor transmitting a pedal effort stroke to the ECU; a motor-based braking unit that includes a motor driven by control of the ECU, to brake the vehicle by holding the rear wheel disc, a decelerator generating output torque using the rotational force of the motor, and a pressing nut fitted on a screw shaft generating axial movement force pressing pads against the wheel disc, using the output torque of the decelerator; a pedal-coupled BIR operating unit that includes a pedal simulator that follows pedal effort characteristics according to hydraulic hysteresis through a spring, when the coupled rod interlocked to the brake pedal moves, an NSL nut fitted on an NSL screw shaft formed of an NSL (Non-Self Locking) type screw and pulling a fixed cable when axially moving by load applied by the pedal simulator, and a solenoid restraining the NSL nut such that the cable is not pulled, when not being turned off by the ECU; and a BIR-equipped braking unit that includes a BIR operating unit that has balls disposed between an input ramp rotated by a hinge lever where the cable is fixed and an output ramp facing the input ramp to convert rotation of the input ramp in to axial movement of the output ramp, and is installed to the front wheel to operate the BIR operating unit such that the motor-base braking unit presses the pads against the wheel disc, using axial straight movement force.

Still another aspect of the invention provides a vehicle brake system using a safety braking device for emergency braking of a vehicle which includes: an ECU that detects the condition of a vehicle and controls braking, to brake the vehicle; a brake pedal that has a sensor transmitting a pedal effort stroke to the ECU; a motor-based braking unit that includes a motor driven by control of the ECU, to brake the vehicle by holding the front wheel disc, a decelerator generating output torque using the rotational force of the motor, and a pressing nut fitted on a screw shaft generating axial movement force pressing pads against the wheel disc, using the output torque of the decelerator; a pedal-coupled BIR operating unit that includes a pedal simulator that follows pedal effort characteristics according to hydraulic hysteresis through a spring, when the coupled rod interlocked to the brake pedal moves, an NSL nut fitted on an NSL screw shaft formed of an NSL (Non-Self Locking) type screw and pulling a fixed cable when axially moving by load applied by the pedal simulator, and a solenoid restraining the NSL nut such that the cable is not pulled, when not being turned off by the ECU; and a BIR-equipped braking unit that includes a BIR operating unit that has balls disposed between an input ramp rotated by a hinge lever where the cable is fixed and an output ramp facing the input ramp to convert rotation of the input ramp in to axial movement of the output ramp, and is installed to the rear wheel to operate the BIR operating unit such that the motor-base braking unit presses the pads against the wheel disc, using axial straight movement force.

When the ECU turns off the solenoid, a ratchet rod of the solenoid releases the NSL nut, such that as the brake pedal is pressed down, the pedal simulator applies force to the NSL screw shaft by movement of the coupled rod, and the NSL screw shaft receiving the force pulls the cable while moving forward, when the solenoid is turned on, the ratchet rod of the solenoid restrains the NSL nut such that the cable is not pulled even through the brake pedal is pressed down, and the ECU controls the rotational force of the motor to achieve functions, other than main braking, such as adjustment of wear of pads.

According to embodiments of the present invention, it is possible to achieve stable FR (Failure Rate), such as hydraulic braking, for EMB or EWB applied to vehicles by providing the BIR (Ball In Ramp) generating straight movement force from rotational force between the balls through the cables interconnected to the brake pedal to the EMB or EWB generating braking force on the basis of motor power in order to achieve F-S (Fail-Safe) and generate emergency braking force for safety through operation of the brake pedal in failure of main braking.

Further, embodiments of the present invention have an advantage of improving common use by further providing the BIR (Ball In Ramp) to the EMB or EWB type braking devices to be interconnected to the brake pedal such that it satisfies laws about BBW (Brake By Wire) braking devices, and also improve applicability to vehicles by achieving main braking operation at the rear wheel that requires smaller braking force than the front wheel.

BRIEF DESCRIPTION OF THE DRAWINGS

For better understanding of the nature and features of the present invention, reference should be made to the following detailed description with the accompanying drawings, in which.

DETAILED DESCRIPTION OF EMBODIMENTS

Embodiments of the invention are described hereafter in detail with reference to the accompanying drawings. The embodiments are just exemplified and the present embodiments can be achieved in various ways by those skilled in the art and is not limited to the embodiments described herein.

Figure 1:
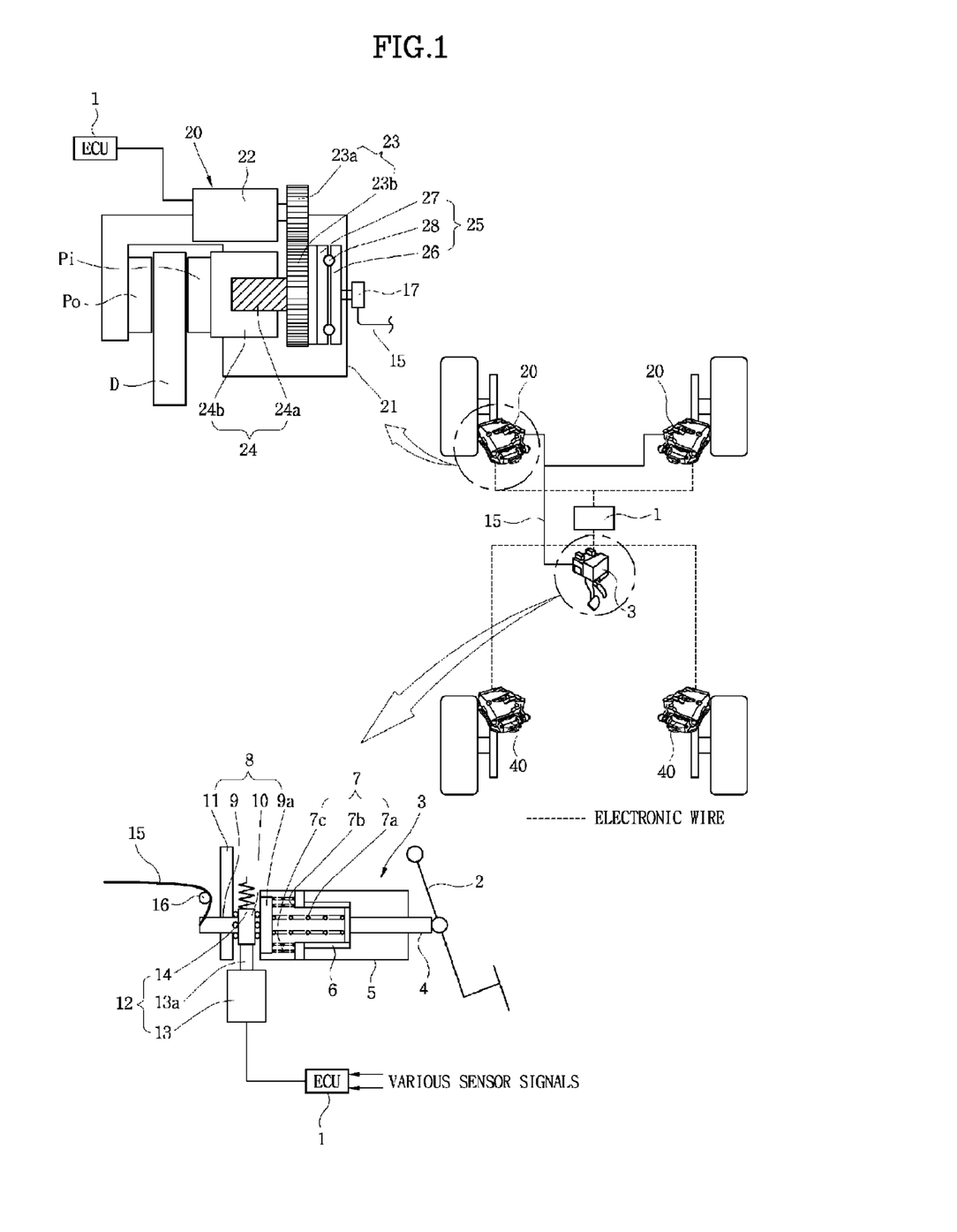
FIG. 1 is a view illustrating the configuration of an auxiliary safety braking device for emergency braking of a vehicle and a vehicle brake system using the auxiliary safety braking device according to one embodiment of the present invention.

FIG. 1 is a view showing a safety braking device for emergency braking of a vehicle and a vehicle brake system using the safety braking device, in which the safety braking device of one embodiment of the present invention includes an ECU 1 that controls a braking operation and a motor-based braking unit 40 that is activated by control of ECU 1 to brake a vehicle by holding a brake pedal 2 and a wheel disc D that implement braking-intention.

The safety braking device of one embodiment of the present invention necessarily includes a BIR operating unit 25 that is provided to motor-based braking unit 40 and applies emergency braking force for safety to motor-based braking unit 40 when a motor fails, and a pedal-coupled BIR operating unit that connects brake pedal 2 with BIR operating unit 25 to operate BIR operating unit 25.

As described above, a BIR-equipped braking unit BIR 20 is formed by providing BIR operating unit 25 to motor-based braking unit 40. BIR-equipped braking unit 20 has a BIR (Ball In Ramp) function, that is, BIR operating unit 25 that pushes motor-based braking unit 40 to wheel disc D, using straight-moving force that is created by changes of ball's path due to rotation of ramps with a ball therebetween, such that it is possible to achieve F-S (Fail-Safe) only by operating brake pedal 2 and achieve a stable FR (Failure Rate) as in a hydraulic braking system by creating emergency braking force for safety, even if the motor of motor-based braking unit 40 that is activated by control of ECU 1 fails or power supply to motor-based braking unit 40 is bad.

EWB (Electro Wedge Brake) that achieves braking by a wedge action that increases input force by pressing brake pads against a disc using a wedge assembly operated by an actuator or EMB (Electro Mechanical Brake) that presses a wheel disc by converting motor power into axial straight-moving force both can be applied to motor-based braking unit 40.

It is described hereafter that the EMB is applied to motor-based braking unit 40 in this embodiment.

Although, the pedal-coupled BIR operating unit constituting the auxiliary safety braking device by operating BIR operating unit 25 of BIR-equipped braking unit 20 of one embodiment of the present invention is configured in various ways, cable mechanism that is pulled by the operation of the pedal between brake pedal 2 and BIR operating unit 25 is applied in this embodiment.

Accordingly, the pedal-coupled BIR operating unit is composed of a coupled rod that is interlocked to brake pedal 2, a pedal simulator 3 that follows pedal effort characteristics in hydraulic hysteresis while coupled rod 4 moves, and a selective connecting member that pulls a cable 15 operating BIR operating unit 25, using the pedal effort of brake pedal 2 only for malfunction of BIR-equipped braking unit 20, even if brake pedal 2 operates.

Pedal simulator 3 as described above is composed of a housing 5 where coupled rod 4 of which one end is connected to brake pedal 2 is inserted, and a pedal effort response member 7 where motion of a moving bracket 6 connected to coupled rod 4 in housing 5 is applied, in order to transmit load for pulling cable 15 in addition to following hydraulic hysteresis.

Pedal effort response member 7 is composed of springs disposed at above and under the center of moving bracket 6, that is has a main spring 7a elastically supported by the center of moving bracket 6 and first and second sub-springs 7b, 7c elastically supported at both sides above and under moving bracket 6.

First and second sub-springs 7b, 7c are formed to have smaller length than main spring 7a.

Since pedal effort response member 7 is composed of a plurality of springs 7a, 7b, 7c as described above, as coupled rod 4 moves moving bracket 6 forward while moving forward by pedal effort of brake pedal 2, main spring 7a is first compressed by movement of moving bracket 6. Thereafter, as more load is continuously applied due to increase of the pedal effort of brake pedal 2, first and second sub-springs 7b, 7c are compressed and deformed together with main spring 7a.

The compressed deformation of main spring 7a and first and second sub-springs 7b, 7c at different time improves pedal operation response for a driver, which allows the pedal operation response for a driver to follow the hydraulic hysteresis characteristics, even in motor-based braking unit 40 in which ECU 1 detects the amount of pedal effort of brake pedals 2 and drives motor 22 in braking.

The selective connecting member is composed of an NSL moving member 8 that is axially moved by external force applied and a restraining member 12. Restraining member 12 is configured such that the BIR unit releases NSL moving member 8 locked, only when motor 22 fails, using ECU 1 controlling motor 22 of braking unit 20.

NSL moving member 8 is a NSL (Non-Self Locking) type screw having a large lead angle at which it moves straight while being released when external force is applied, and which has a load input end 9a at one end where load is applied, and an NSL screw shaft 9 where cable 15 is fixed and an NSL nut 10 fitted on NSL screw shaft 9, at the other end.

Cable 15 fixed to the end of NSL screw shaft 9 is held by a position pin 16 and position pin 16 operates such that cable 15 is easily pulled by NSL screw shaft 9.

A structure engaged with the outside is formed on NSL nut 10 to restrain releasing of NSL screw shaft 9 and a stopper bracket 11 that restricts movement distance of NSL nut 10 is further provided to restrict movement distance of NSL screw shaft 9.

Restraining member 12 is provided to restrict and release movement of NSL moving member 8 of NSL type (Non-Self Locking), and for this operation, which includes a solenoid 13 having a ratchet rod 13a that releases NSL moving member 8, when it is turned on by ECU 1 detecting breakdown of motor 22.

Ratchet rod 13a restrains and releases NSL nut 10 of NSL moving member 8, and for this operation, NSL nut 10 is provided with a structure engaged with a ratchet.

Restraining member 12 is further provided with a return spring 14 that applies elastic return force to ratchet rod 13a restraining NSL moving member 8, when solenoid 13 is turned off.

In the safety braking assistant device according to this embodiment, cable 15 is fixed at brake pedal 2 by pedal simulator 3 using the plurality of springs 7a, 7b, 7c and NSL type NSL moving member 8 using the locking or releasing operation of solenoid 13, and BIR operating unit 25 that achieves the BIR (Ball In Ramp) function is fixed in BIR-equipped braking unit 20 at the opposite side to cable 15, such that the operational force of brake pedal 2 is transmitted to BIR-equipped operating unit 25 and wheel disc D is correspondingly locked.

This operation of cable 15 is achieved, when EMB type motor-based braking unit 40 of BIR-equipped braking unit 20 fails, such that normal operation of motor-based braking unit 40 is first described.

That is, in motor-based braking unit 40, ECU 1 that has checked the amount of pedal effort of brake pedal 2, using a sensor, drives motor 22 disposed in housing 21 having a predetermined shape, while considering traveling states and braking conditions of a vehicle.

In the operation of motor 22, referring to FIG. 1, the rotation of motor 22 is converted into output torque through a decelerator 23 composed of driving and driven gears 23a, 23b and the output torque is then transmitted to a motion converting member 24 to be converted into axial straight movement force that presses pads Pi, Po against wheel disc D.

In this configuration, decelerator 23 has a plurality of gears for the configuration of driven gear 23b to convert the rotation of driving gear 23a into larger output torque.

Further, in motion converting member 24, as a screw shaft 24a rotates, a pressing nut 24b engaged with screw shaft 24a moves straight away from screw shaft 24a and pads Pi, Po are correspondingly pressed against wheel disc D by the straight movement of pressing nut 24b.

The normal operation of motor-based braking unit 40 as described above is also achieved the same in BIR-equipped braking unit 20.

However, the safety braking assistant device operates, when the normal braking is not made, such as when motor 22 fails.

Figure 2:
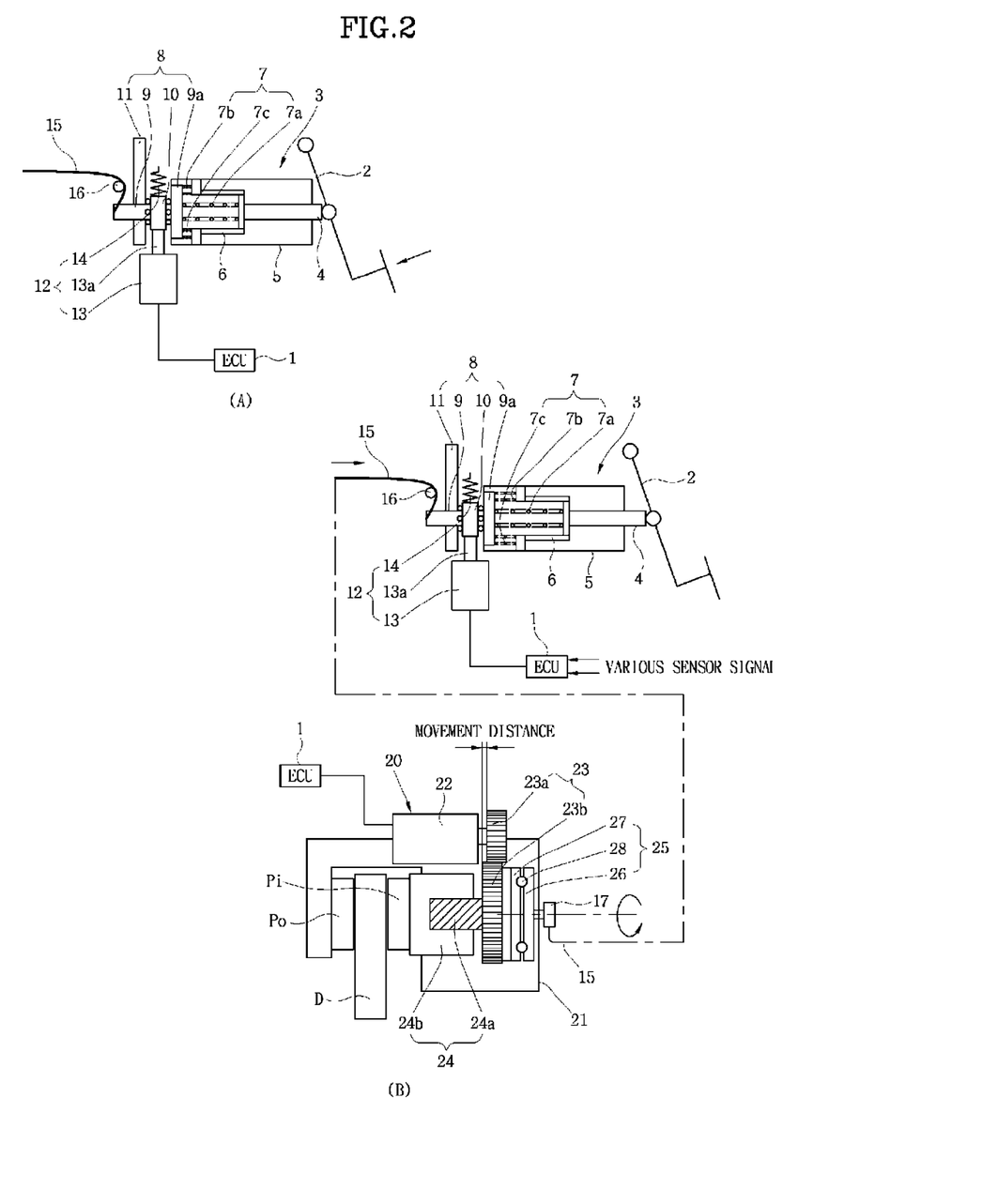
FIGS. 2A and 2B are views illustrating the braking operation of the auxiliary safety braking device when an electric braking device fails.

As show in FIGS. 2A and 2B, when detecting an error of motor of BIR-equipped braking unit 20, ECU 1 turns on solenoid 13 such that ratchet rod 13a is inserted while pulling return spring 14, such that NSL moving member 8 restrained is released.

As NSL screw shaft 9 is allowed to move by separation of ratchet rod 13a of solenoid 13 from NSL nut 10, cable 15 is pulled by the amount of pedal effort of brake pedal 2 pressed down by a driver. Further, as cable 15 moves, BIR operating unit 25 of BIR-equipped braking unit 20 presses decelerator 23, such that motion converting member 24 presses pads Pi, Po against wheel disc D, together with decelerator 23, thereby generating braking force.

That is, as the amount of pedal effort of brake pedal 2 is transmitted to pedal simulator 3 through coupled rod 4, moving bracket 6 is moved by coupled rod 4 and main spring 7a is compressed and then first and second sub-springs 7b, 7c are compressed by larger force, such that the pedal effort of brake pedal 2 is transmitted.

The load transmitted through springs 7a, 7b, 7c moves straight NSL screw shaft 9 through load input end 9a, and as NSL screw shaft 9 moves straight, cable 15 held by position pin 16 is pulled.

The movement of NSL screw shaft 9 is possible because NSL nut 10 is not restrained by solenoid 13.

Further, force is applied to BIR operating unit 25 of BIR-equipped braking unit 20 fixed to the opposite side to cable 15 pulled, and BIR operating unit 25 receiving the force through cable 15 generates axial movement force while rotating.

That is, as a hinge lever 17 where cable 15 is fixed is rotated by the pulling force, an input ramp 26 is rotated by hinge lever 17, such that balls 28 positioned in the groove of input ramp 26 push an output ramp 27 at the opposite side while being moved by the rotation of input ramp 26.

Output ramp 27 pushed by balls 28 presses decelerator 23, that is, presses driven gear 23b engaged in parallel with driving gear 23a of decelerator 23.

Pressed driven gear 23b slides with respect to driving gear 23a, which pushes screw shaft 24a fixed and rotating with driving gear 23a and simultaneously pushes screw shaft 24a and pressing nut 24b, such that pads Pi, Po press wheel disc D by straight movement of pressing nut 24b, thereby generating braking force.

Therefore, since cable 15 is pulled by the operation of the brake pedal 2 and BIR operating unit 25 generates axial movement load, it is possible to achieve emergency braking in which pads Pi, Po hold wheel disc D, even if output torque pressing wheel disc D is not generated due to failure of motor 22.

On the other hand, the safety braking assistant device of one embodiment of the present invention can have various changed structures, and for example, it is possible to change in various ways the structure of pedal simulator 3 connecting a brake pedal 2 with cable 15.

Figure 3:
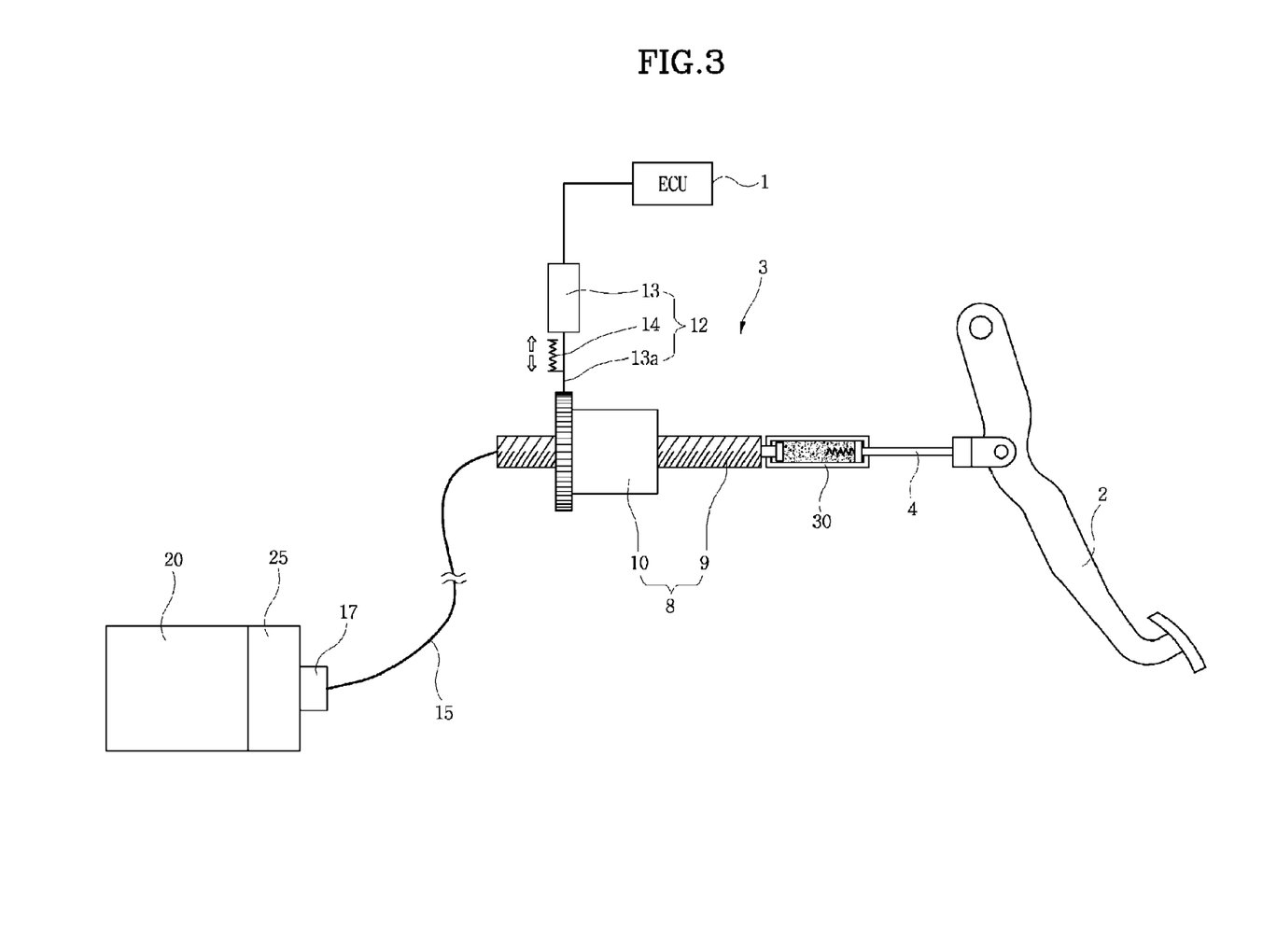
FIG. 3 is a view showing another embodiment of an auxiliary safety braking device according to one embodiment of the present invention.

As shown in FIG. 3, a pedal effort tuning member 30, in which the structure of pedal effort response member 7 composed of a plurality of springs 7a, 7b, 7c that directly receive force from coupled rod 4 fixed to brake pedal 2 is changed, may be applied.

Pedal effort tuning member 30 is provided to improve the performance of following hydraulic hysteresis characteristics using main spring 7a and sub-springs 7b, 7c, and for example, may be configured to include a damper having fluid therein and returning by elastic return force of a spring while moving forward by hydraulic pressure and NSL screw type NSL screw shaft 9 combined with the damper.

NSC type NSL nut 10 is fitted on NSL screw shaft 9.

Ratchet rod 13a combined with NSL nut 10 to restrict and release movement of NSL screw shaft 9 is operated by solenoid 13 to release engagement with NSL nut 10, when it is turned on by ECU 1 that detects failure of motor 22, and ratchet rod 13a has a return spring 14 that applies elastic return force, when solenoid 13 is turned off.

According to a vehicle braking device equipped with the safety braking device of one embodiment of the present invention, as shown in FIG. 1, it is preferable that BIR operating unit 25 is basically provided, BIR-equipped braking unit 20 is installed at the front wheel, cable 15 that is operated by brake pedal 2 is connected to BIR operating unit 25, and motor-based braking unit 40 without BIR operating unit 25 is installed at the rear wheel.

However, since braking is sufficiently achieved in common front wheel-driven vehicles, even if braking force for the rear wheels is relatively smaller than the front wheels, it is possible to install motor-based braking unit 40 to the front wheel, and provide BIR operating unit 25 connected through cable 15 and install BIR-equipped braking unit 20 to be rear wheel.

Figure 4:
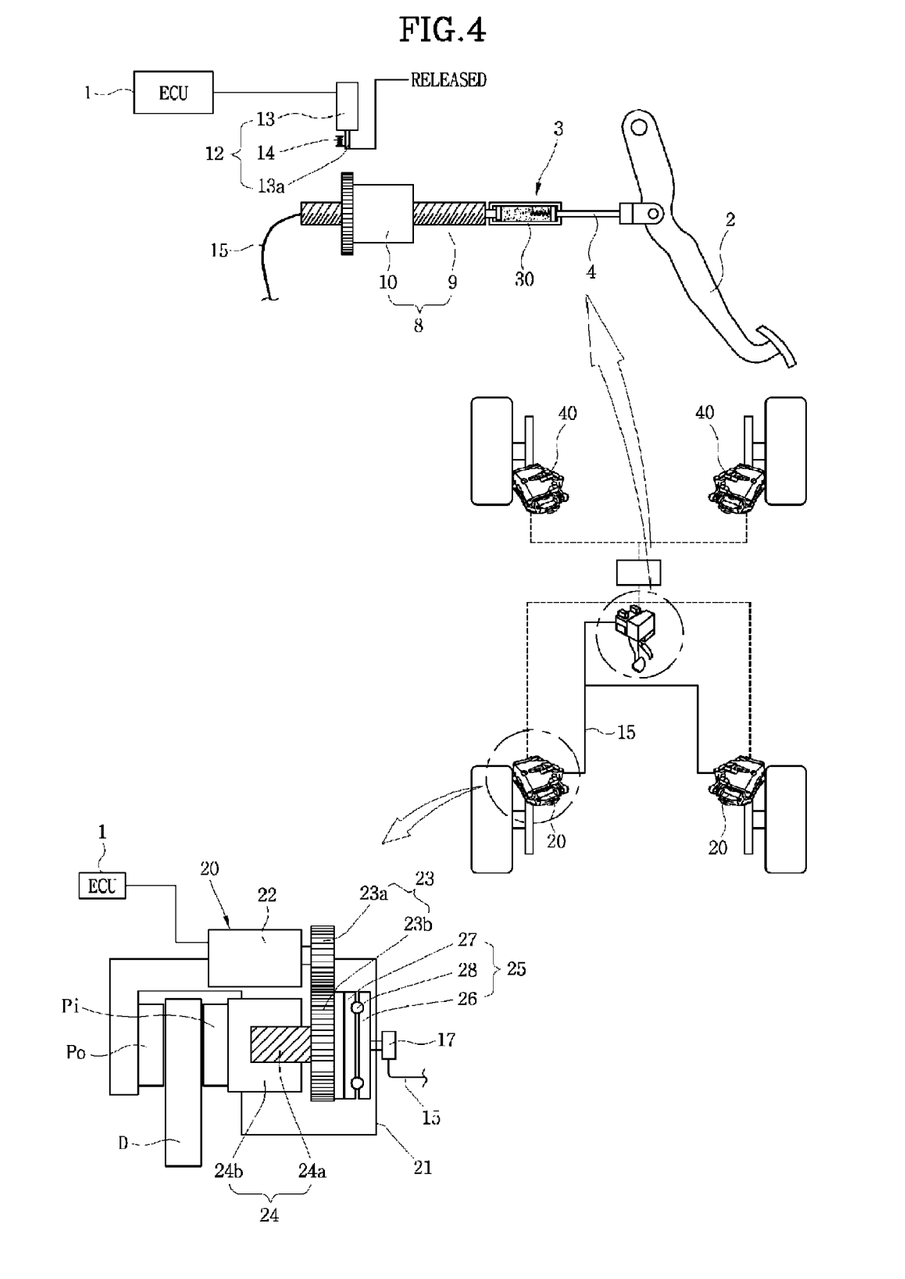
FIG. 4 is a view illustrating the configuration of the auxiliary safety braking device according to one embodiment of the present invention, which is used for a vehicle brake system by applying to the rear wheel as a main braking force providing unit of the vehicle.

According to this configuration, as show in FIG. 4, motor-based braking unit 40 at the front wheel uses the output torque through the motor in braking, BIR-equipped braking unit 20 at the rear wheel uses axial movement load generated by BIR operating unit 25 through cable 15 for braking, and the output torque of the motor acts only for a specific function, such as compensating wear of pads.

Accordingly, it is possible to achieve an advantage in that BIR-equipped braking unit 20 for the rear wheel reduces the specification of the motor and the overall specifications of all of the components, such as caliper.

In this modification, the safety braking assistant device operates opposite to when simple braking force is generated, that is, the operation of cable 15 by turning on or off of solenoid 13 is made in the opposite way.

When solenoid 13 is turned off as shown in FIG. 4, ratchet rod 13a of solenoid 13 does not restrain NSL nut 10, such that as brake pedal 2 is pressed down, coupled rod 4 moves and pedal simulator (3, pedal effort tuning member 30 according to the embodiment) applies force to NSL screw shaft 9.

As NSL screw shaft 9 receives the force as described above, NSL nut 10 that is released from solenoid 13 rotates and NSL screw shaft 9 correspondingly moves forward, and cable 15 is pulled by the forward movement of NSL screw shaft 9.

Further, as cable 15 is pulled, force is applied to BIR operating unit 25 of BIR-equipped braking unit 20, and axial movement force is generated at output ramp 27 by rotation of input ramp 26 and operation of balls 28 in BIR operating unit 25 receiving the force through cable 15.

The axial movement force of BIR operating unit 25 presses decelerator 23, that is, driven gear 23b pressed by driving gear 23a of decelerator 23 slides and screw shaft 24a fixed to driving gear 23a and pressing nut 24b are pushed and press pads Pi, Po against wheel disc D, such that wheel disc D stops, thereby achieving braking.

The braking force transmitted through BIR operating unit 25 to hold wheel disc D is relatively smaller than the output torque of motor 22, which makes it possible to ensure sufficient safety for braking a vehicle, because the rear wheel requires relatively smaller braking force than the front wheel, when motor-based braking unit 40 is installed to the front wheel.

Figure 5:
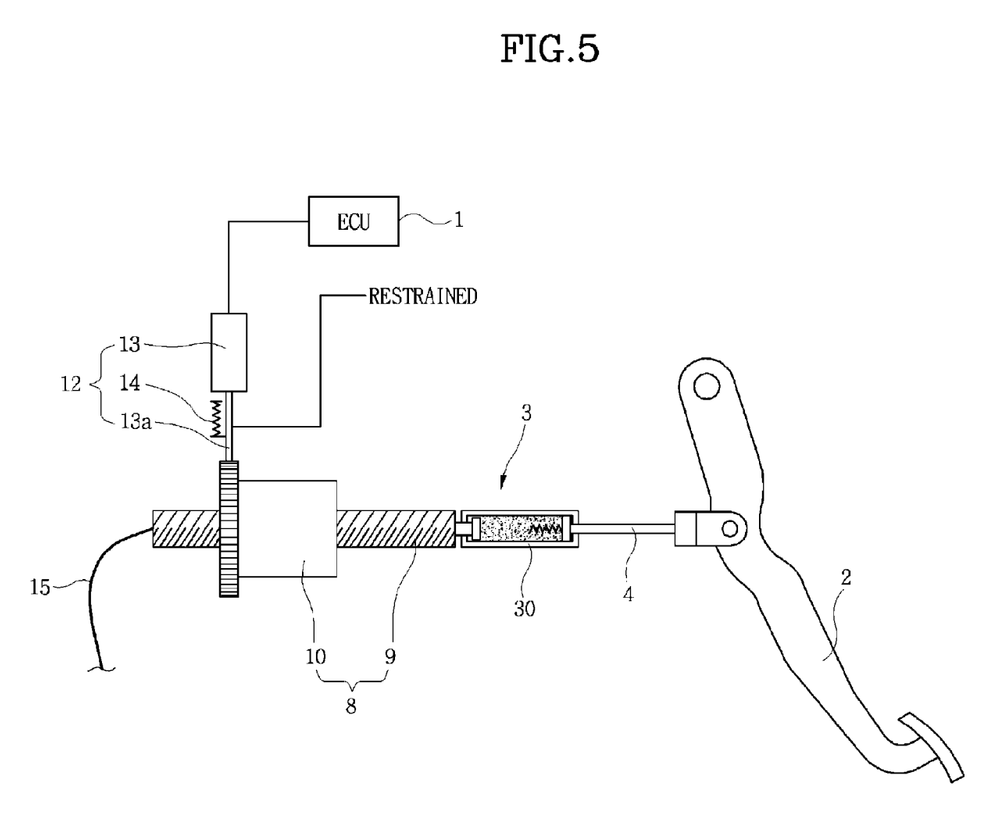
FIG. 5 is a view illustrating when the auxiliary safety braking device shown in FIG. 4 is locked.

On the other hand, in this embodiment, as solenoid 13 is turned on, as shown in FIG. 5, ratchet rod 13a of solenoid 13 is drawn out and a restraining state is achieved by engaging with the ratchet portion of NSL nut 10.

This operation of solenoid 13 restricts movement of NSL screw shaft 9 and prevents external force from being transmitted to brake pedal 2, particularly external force (e.g., braking force) that is transmitted backward through cable 15 in ABS is blocked by NSL screw shaft 9 and pedal simulator (3, pedal effort tuning member 30 according to the embodiment), such that the external force is not transmitted to brake pedal 2 pressed down by the driver, thereby improving smooth pedal response.

What is claimed is:

1. A safety braking device of a vehicle, comprising:
    an electronic control unit (ECU) configured to detect the condition of a vehicle and further configured to control braking of the vehicle;
    a brake pedal comprising a sensor transmitting a signal representing a pedal effort stroke to the ECU;
    a motor-based braking unit comprising a motor driven by control of the ECU, and a pad pressing portion coupled to the motor and configured to press a pad toward a wheel disc;
    a pedal-coupled ball-in-ramp (BIR) operating unit connected to the brake pedal, the pedal-coupled BIR operating unit being configured to pull a cable connected to the motor-based braking unit in response to pressing down of the brake pedal when the ECU detects failure of the motor; and
    a BIR unit coupled to the pad pressing portion of the motor-based braking unit, the BIR unit being configured to generate axial straight movement force to operate the pad pressing portion in response to pulling force of the cable.

2. The safety braking device as defined in claim 1, wherein the pedal-coupled BIR operating unit includes:
    a coupling rod connected to the brake pedal;
    a pedal simulator connected to the coupling rod, and comprising one or more springs to provide a simulation force to the brake pedal; and
    a selective connecting member connected to the cable and the pedal simulator, the selective connecting member being configured to selectively transmit movement force transmitted from the pedal simulator to the cable in response to the control of the ECU.

3. The safety braking device as defined in claim 2, wherein the pedal simulator includes:
    a housing;
    a moving bracket connected to the coupling rod and disposed in the housing; and
    a pedal effort response member comprising the one or more springs that are elastically supported by the moving bracket.

4. The safety braking device as defined in claim 3, wherein the pedal effort response member further comprises fluid contained in the housing.

5. The safety braking device as defined in claim 2, wherein the selective connecting member comprises a NLS (Non-Self Locking) type screw configured to be axially moved by external force applied, wherein the NLS type screw comprises an NSL screw shaft having one end configured to receive load from the pedal simulator and the other end connected to the cable, an NSL nut engaged with the NSL screw shaft, a ratchet rod elastically supported by a return spring and configured to restrain or release the NSL nut, and a solenoid connected to a ratchet rod and configured to be operated under the control of the ECU.

6. The safety braking device as defined in claim 1, wherein the BIR unit includes:
    a hinge lever connected to the cable;
    an input ramp configured to be rotated by the hinge lever;
    an output ramp disposed to face the input ramp; and
    balls disposed between the input and output ramps, and configured to axially push the output ramp in response to the rotation of the input ramp.

7. The safety braking device as defined in claim 6, wherein the pad pressing portion comprises;
    a decelerator having driving and driven gears to transmit the rotation of the motor; a screw shaft connected to the driven gear; and
    a pressing nut engaged with the screw shaft and configured to convert the rotation of the motor into an axial straight movement to press the pad.

8. The safety braking device as defined in claim 7, wherein the driven gear of the decelerator is connected to the BIR unit to receive axial pressing force from the BIR unit.

9. A vehicle brake system of a vehicle, the vehicle brake system comprising:
    an electronic control unit (ECU) configured to detect the condition of a vehicle and further configured to control braking of the vehicle;
    a brake pedal comprising a sensor transmitting a signal representing a pedal effort stroke to the ECU;
    a first motor-based braking unit comprising a motor configured to be driven by the control of the ECU, a screw shaft connected to the motor, and a pressing nut engaged with the screw shaft to press a pad toward a rear wheel disc, the first motor-based braking unit being installed to a vehicle to brake a rear wheel;
    a pedal-coupled ball-in-ramp (BIR) operating unit connected to a pedal simulator, an NSL nut engaged with an NSL screw shaft formed of an NSL (Non-Self Locking) type screw, the NSL screw being configured to pull a fixed cable when axially moving by load applied by the pedal simulator, and a solenoid configured to restrain the NSL nut such that the cable is not pulled, when not being turned off by the ECU; and
    a BIR-equipped braking unit comprising a second motor-based braking unit and a BIR unit, the BIR unit comprising balls disposed between an input ramp rotated by a hinge lever that the cable is fixed to and an output ramp facing the input ramp to convert rotation of the input ramp into axial movement of the output ramp, the BIR-equipped braking unit being installed to the vehicle to brake a front wheel and configured to operate at least part of the second motor-based braking unit to presses a pad toward a front wheel disc, using axial straight movement transmitted from the BIR unit.

10. A vehicle brake system of a vehicle, the vehicle brake system comprising:
    an electronic control unit (ECU) configured to detect the condition of a vehicle and further configured to control braking of the vehicle;
    a brake pedal comprising a sensor transmitting a signal representing a pedal effort stroke to the ECU;
    a first motor-based braking unit comprising a motor configured to be driven by the control of the ECU, a screw shaft connected to the motor, and a pressing nut engaged with the screw shaft to press a pad toward a front wheel disc, the first motor-based braking unit being installed to a vehicle to brake a front wheel;

a pedal-coupled ball-in-ramp (BIR) operating unit connected to a pedal simulator, an NSL nut engaged with an NSL screw shaft formed of an NSL (Non-Self Locking) type screw, the NSL screw being configured to pull a fixed cable when axially moving by load applied by the pedal simulator, and a solenoid configured to restrain the NSL nut such that the cable is not pulled, when not being turned off by the ECU; and a BIR-equipped braking unit comprising a second motor-based braking unit and a BIR unit, the BIR unit comprising balls disposed between an input ramp rotated by a hinge lever that the cable is fixed to and an output ramp facing the input ramp to convert rotation of the input ramp into axial movement of the output ramp, the BIR-equipped braking unit being installed to the vehicle to brake a rear wheel and configured to operate at least part of the second motor-based braking unit to presses a pad toward a rear wheel disc, using axial movement transmitted from the BIR unit.

11. The vehicle brake system as defined in claim 10, wherein the pedal-coupled ball-in-ramp (BIR) operating unit is configured such that, when the ECU turns off the solenoid, a ratchet rod of the solenoid releases the NSL nut such that as the brake pedal is pressed down, the pedal simulator applies force to the NSL screw shaft by movement of a coupling rod, and the NSL screw shaft receiving the force to pull the cable while moving forward, wherein the pedal-coupled ball-in-ramp (BIR) operating unit is further configured such that, when the solenoid is turned on, the ratchet rod of the solenoid restrains the NSL nut such that the cable is not pulled even through the brake pedal is pressed down, and wherein the ECU is configured to control the rotation of the motor in response to wear of pads.

* * * * *